US012768289B1

(12) United States Patent
Whittle et al.

(10) Patent No.: US 12,768,289 B1
(45) Date of Patent: Oct. 20, 2026

(54) RETAINING SPLIT RING STACK FOR CERAMIC MATRIC COMPOSITE COMPONENTS AND METHOD

(71) Applicant: RTX CORPORATION, Farmington, CT (US)

(72) Inventors: David Dwyer Whittle, Suffield, CT (US); Thiago B Vieira, Sarasota, FL (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 19/196,303

(22) Filed: May 1, 2025

(51) Int. Cl.
*F01D 25/24* (2006.01)

(52) U.S. Cl.
CPC ........ *F01D 25/246* (2013.01); *F05D 2260/36* (2013.01); *F05D 2300/17* (2013.01); *F05D 2300/6033* (2013.01)

(58) Field of Classification Search
CPC ............... F01D 25/246; F05D 2260/36; F05D 2300/17; F05D 2300/6033
See application file for complete search history.

(56) References Cited

U.S. PATENT DOCUMENTS

| | | | | |
|---|---|---|---|---|
| 7,334,980 B2 * | 2/2008 | Trinks | F01D 9/04 | 415/230 |
| 7,721,433 B2 * | 5/2010 | Thompson | F01D 11/08 | 29/889.22 |
| 8,491,267 B2 * | 7/2013 | Glasspoole | F01D 5/025 | 416/221 |
| 8,585,369 B2 * | 11/2013 | Aubin | F01D 5/3015 | 416/221 |
| 9,790,803 B2 * | 10/2017 | Anderson | F01D 5/326 | |
| 11,939,888 B2 * | 3/2024 | Surace | F01D 9/042 | |

* cited by examiner

*Primary Examiner* — Eldon T Brockman
(74) *Attorney, Agent, or Firm* — Christopher B. Kilner; MILLEN, WHITE, ZELANO & BRANIGAN, P.C.

(57) ABSTRACT

A retaining split ring stack for axial retention of a ceramic matric composite (CMC) gas path component includes an outer-most split ring and an inner-most split ring. The outer-most split ring is configured for retention within a diametric groove within a support structure, and includes an inner diameter with a plurality of scallops. The inner-most split ring has a smaller outer diameter, an upstream surface configured for contact with the CMC gas path component, and a downstream surface including a plurality of tabs extending therefrom and configured for engagement with respective scallops of the outer-most split ring. This configuration permits radial movement from the cooler outer-most split ring with the support structure. The inner-most split ring can then be sized to mitigate the radial deflection and hoop stress within the CMC gas path component.

20 Claims, 4 Drawing Sheets

RETAINING SPLIT RING STACK FOR CERAMIC MATRIC COMPOSITE COMPONENTS AND METHOD

FIELD OF THE INVENTION

The subject matter disclosed herein relates to split retainer rings used to axially retain gas turbine engine components and, in particular, to a split ring stack for retaining ceramic matrix composite (CMC) rings and associated methods therefor.

BACKGROUND OF THE INVENTION

Gas turbine engines or jet engines, in general, include a fan section, a compressor section, a combustion section, and a turbine section. Air enters through the fan section and is compressed in the compressor section before being introduced into the combustion section. In the combustion section, the air is mixed with fuel and ignited to generate a high-energy, high temperature gas flow. The high-energy, high temperature gas flow is expanded in the turbine section which is used to create thrust and to drive the compressor and fan sections.

Certain components of gas turbine engines are thus exposed to the high-energy, high temperature gas flow (i.e., gaspath components). Therefore, it is desirable that such components be made of heat-resistant materials such as ceramic matrix composites (CMCs), which can withstand much higher operating temperatures than components composed of metal superalloys. Silicon Carbide (SiC) based CMCs fabricated via Chemical Vapor Infiltration (CVI), Melt Infiltration (MI), Polymer Infiltration and Pyrolysis (PIP), and hybrids of CVI/MI and CVI/PIP possess such high temperature capability.

Split retainer rings formed of high temperature metal alloys are commonly used to provide axial retention for different CMC components such as turbine stators (full hoop or segmented), seals, and blade outer air seal (BOAS, also known as a blade shroud) segments. These rings are axially split in one location to allow for over compression during assembly, reducing the effective outer diameter, and springing back into a free state within a trapped diametric groove machined into a static structure.

Because the metallic retention rings contact a CMC component subject to high temperatures, the metallic retention rings may encounter the problem of differential thermal growth effects due to large differences in the Coefficient of Thermal Expansion (CTE) between the metallic retention rings and CMC components. CMC components that rely on axial retention can be subject to increased hoop stresses due to the differential thermal growth between the metallic split ring and the static support structure relative to the lower CMC gas path component thermal growth.

The above information disclosed in this Background section is only for understanding of the background of the inventive concepts and, therefore, it may contain information that does not constitute prior art.

SUMMARY OF THE INVENTION

The present disclosure is directed, in a first aspect, to a retaining split ring stack for axial retention of a ceramic matric composite (CMC) gas path component. The retaining split ring stack includes an outer-most split ring having a first outer diameter configured for retention within a diametric groove within a support structure, a first inner diameter including a plurality of scallops, and a first split portion configured to permit compression of the outer-most ring to a first smaller diameter for installation within the diametric groove. The retaining split ring stack further includes an inner-most split ring having a second outer diameter smaller than the first outer diameter, a second inner diameter, an upstream surface configured for contact with the CMC gas path component, a downstream surface including a plurality of tabs extending therefrom and configured for engagement with respective scallops of the outer-most split ring, and a second split portion configured to permit compression of the inner-most ring to a second smaller diameter for installation of the tabs within the respective scallops of the outer-most split ring.

In an embodiment, the outer-most split ring may be formed of a metallic alloy.

In another embodiment, the inner-most split ring may be formed of a metallic alloy.

In a further embodiment, when the inner-most split ring is formed of a metallic alloy, the inner-most split ring may include a coating on at least the upstream surface.

In yet another embodiment, the plurality of scallops may be evenly spaced around the first inner diameter.

In an embodiment where the scallops are evenly spaced, the plurality of tabs may be evenly spaced around the downstream surface of the inner-most split ring.

In another embodiment, the plurality of tabs may be dimensioned smaller than the plurality of scallops so as to form a clearance gap to allow the tabs to fit within the scallops both when the inner-split ring is compressed to the second smaller diameter and when the inner-split ring is uncompressed to the second outside diameter.

The present disclosure is also directed, in a second aspect, to a method for axial retention of a ceramic matric composite (CMC) gas path component using a retaining split ring stack. The method includes: compressing an outer-most split ring from a first outer diameter to a first smaller diameter for installation within a diametric groove, wherein the outer-most split ring includes a plurality of scallops on an inner diameter thereof; positioning the outer-most split ring in axial alignment with the diametric groove; uncompressing the outer-most split ring to engage the diametric groove; compressing an inner-most split ring from a second outer diameter smaller than the first outer diameter to a second smaller diameter, wherein the inner-most split ring includes a plurality of tabs on a downstream surface thereof; positioning the plurality of tabs in axial alignment with the plurality of scallops; and uncompressing the inner-most split ring for installation of the tabs within respective scallops of the outer-most split ring.

In an embodiment of the method, the outer-most split ring may be formed of a metallic alloy, and the diametric groove may be disposed in a static support structure to axially fix the outer-most split ring.

In another embodiment of the method, the inner-most split ring may be formed of a metallic alloy, and an upstream surface of the inner-most split ring may be positioned against the CMC gas path component to axially retain the CMC gas path component.

In a further embodiment, the method may include providing a coating on the upstream surface of the inner-most split ring that contacts the CMC gas path component.

In yet another embodiment, the method may include evenly spacing the plurality of scallops around the first inner diameter and/or evenly spacing the plurality of tabs around the downstream surface of the inner-most split ring.

In an embodiment, the method may further include dimensioning the plurality of tabs smaller than the plurality of scallops so as to form a clearance gap to allow the tabs to fit within the scallops both when the inner-split ring is compressed to the second smaller diameter and when the inner-split ring is uncompressed to the second outer diameter.

The present disclosure is further directed, in a third aspect, to a retaining split ring stack for axial retention of a ceramic matric composite (CMC) gas path component. The retaining split ring stack includes an outer-most split ring made of metal and having a first outer diameter configured for retention within a diametric groove within a support structure, a first inner diameter including a plurality of scallops evenly space from one another, and a first split portion configured to permit compression of the outer-most ring to a first smaller diameter for installation within the diametric groove. The retaining split ring stack also includes an inner-most split ring made of metal and having a second outer diameter smaller than the first outer diameter, a second inner diameter, an upstream surface configured for contact with the CMC gas path component, a downstream surface including a plurality of tabs extending therefrom that are evenly spaced from one another and configured for engagement with respective scallops of the outer-most split ring, and a second split portion configured to permit compression of the inner-most ring to a second smaller diameter for installation of the tabs within the respective scallops of the outer-most split ring.

In an embodiment, the outer-most split ring may be formed of a high Nickel (Ni) content alloy.

In another embodiment, the inner-most split ring may be formed of a high Nickel (Ni) content alloy or a high Cobalt (Co) content alloy.

In a further embodiment, the inner-most split ring may be formed of a high Nickel (Ni) content alloy, and the inner-most split ring may include an environmental barrier coating (EBC) on at least the upstream surface.

In yet another embodiment, the outer-most split ring may be formed of a high Nickel (Ni) content alloy, and the inner-most split ring is formed of a high Nickel (Ni) content alloy or a high Cobalt (Co) content alloy.

In an embodiment, the plurality of tabs may be dimensioned smaller than the plurality of scallops so as to form a clearance gap to allow the tabs to fit within the scallops both when the inner-split ring is compressed to the second smaller diameter and when the inner-split ring is uncompressed to the second outside diameter.

BRIEF DESCRIPTION OF FIGURES

The features of the disclosure believed to be novel and the elements characteristic of the invention are set forth with particularity in the appended claims. The figures are for illustration purposes only and are not drawn to scale. The disclosure itself, however, both as to organization and method of operation, can best be understood by reference to the description of the preferred embodiment(s) which follows, taken in conjunction with the accompanying drawings in which:

DETAILED DESCRIPTION OF THE INVENTION

Figure 1:
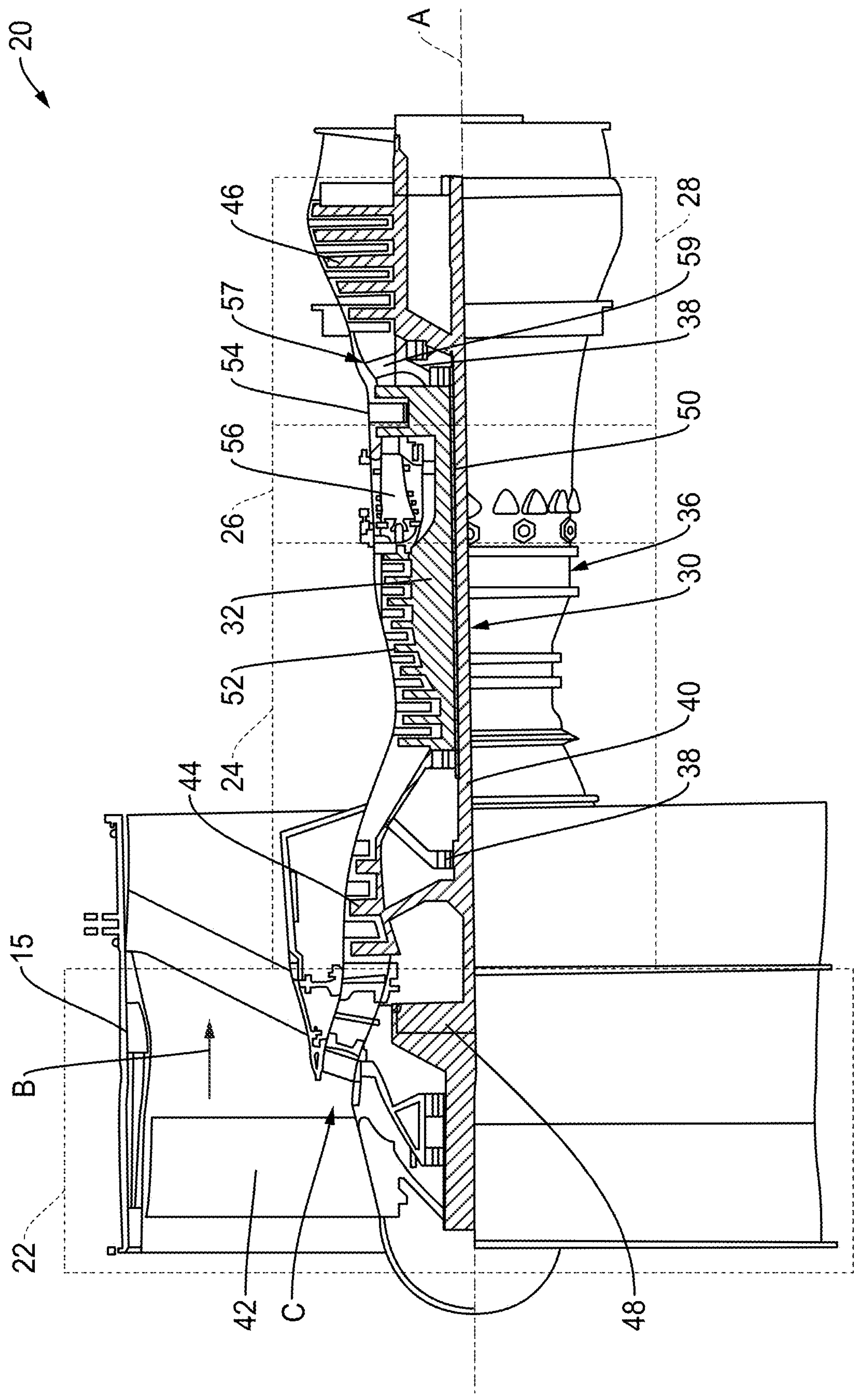
FIG. 1 schematically illustrates a partial cross section of an exemplary gas turbine engine.

The embodiments of the present disclosure can comprise, consist of, and consist essentially of the features and/or steps described herein, as well as any of the additional or optional ingredients, components, steps, or limitations described herein or would otherwise be appreciated by one of skill in the art.

The following discussion omits or only briefly describes conventional features of the disclosed technology that are apparent to those skilled in the art. Reference to a particular embodiment does not limit the scope of the claims attached hereto. Additionally, any examples set forth in this specification are intended to be non-limiting and merely set forth some of the many possible embodiments for the appended claims. Further, particular features described herein can be used in combination with other described features in each of the various possible combinations and permutations. A person of ordinary skill in the art would know how to use the instant invention, in combination with routine experiments, to achieve other outcomes not specifically disclosed in the examples or the embodiments.

Unless otherwise specifically defined herein, all terms are to be given their broadest possible interpretation including meanings implied from the specification as well as meanings understood by those skilled in the art and/or as defined in dictionaries, treatises, etc. Unless defined otherwise, all technical and scientific terms used herein have the same meaning as commonly understood by one of ordinary skill in the art in the field of the disclosed technology. It must also be noted that, as used in the specification and the appended claims, the singular forms "a," "an," and "the" include plural referents unless otherwise specified, and that the terms "includes" and/or "including," when used in this specification, specify the presence of stated features, elements, and/or components, but do not preclude the presence or addition of one or more other features, steps, operations, elements, components, and/or groups thereof. Additionally, methods, equipment, and materials similar or equivalent to those described herein can also be used in the practice or testing of the disclosed technology.

The devices of the present disclosure may be understood more readily by reference to the following detailed description of the embodiments taken in connection with the accompanying drawing figures, which form a part of this disclosure. It is to be understood that this application is not limited to the specific devices, methods, conditions or parameters described and/or shown herein, and that the terminology used herein is for the purpose of describing particular embodiments by way of example only and is not intended to be limiting. All spatial references, such as, for example, proximal, distal, horizontal, vertical, top, upper, lower, bottom, left and right, are for illustrative purposes only and can be varied within the scope of the disclosure. For example, the references "inner-most" and "outer-most" are relative and used only in the context to the other, and are not necessarily "superior" and "inferior."

It will further be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

Various examples of the disclosed technology are provided throughout this disclosure. The use of these examples is illustrative only, and in no way limits the scope and meaning of the invention or of any exemplified form. Likewise, the invention is not limited to any particular preferred embodiment(s) described herein. Indeed, modifications and variations of the invention may be apparent to those skilled in the art upon reading this specification, and can be made without departing from its spirit and scope. The invention is therefore to be limited only by the terms of the claims, along with the full scope of equivalents to which the claims are entitled.

In the discussion below, axial refers to a direction that coincides with the longitudinal axis of the engine. Radial refers to a direction that is radial with respect to the longitudinal axis of the engine. Circumferential refers to a direction that corresponds to the circumference of a circle around the longitudinal axis of the engine. The leading edge/portion of a structure is the edge/portion that faces into the flow of the hot gases, i.e., faces upstream. The trailing edge/portion of a structure is the edge/portion that the faces away from the flow of the hot gases, i.e., faces downstream.

The present disclosure is directed to the use of two unique split rings to accomplish the primary function of a conventional axial retention split ring. The outer-most split ring is conventionally installed into the static support structure groove by compressing the ring to shrink the outer diameter. The second inner-most ring is also compressed to have axial tabs pass through scallops on an inner diameter the outer-most ring so as to assemble the two split rings via the axial tabs and scallops.

Accordingly, the outer-most split ring has a plurality of radial spline scallops to accept a corresponding axial spline extending from an aft side of the inner-most split ring. The outer-most split ring is permitted to grow with the static support structure while the inner-most split ring provides constant contact with the CMC gas path component. The separation between the inner-most and outer-most rings provides an opportunity to limit the bearing surface area and transfer of thermal gradients and normal axial load. The scallops and tabs permit radial movement from the cooler outer-most slit ring with the outer static support structure. The inner-most split ring can then be sized to mitigate the radial deflection and hoop stress within the CMC gas path component.

FIG. 1 schematically illustrates an example of a gas turbine engine 20 (i.e., a two-spool turbofan) which includes a fan section 22, a compressor section 24, a combustor section 26, and a turbine section 28. Fan section 22 drives air along a bypass flow path B in a bypass duct defined within a housing 15, and also along a core flow path C for compression in compressor section 24, with subsequent introduction into combustor section 26, followed by expansion through turbine section 28. Although FIG. 1 depicts a two-spool turbofan gas turbine engine, it should be understood that the concepts described herein are not limited to use with two-spool turbofans engines and may be applied to other types of turbine engines.

Engine 20 generally includes a low speed spool 30 and a high-speed spool 32 mounted for rotation about an engine central longitudinal axis A, relative to an engine static structure 36, via several bearing systems 38. Various bearing systems 38 at various locations may alternatively or additionally be provided. The location of bearing systems 38 may be varied as appropriate to the application.

The low speed spool 30 generally includes an inner shaft 40 that interconnects, a first (or low) pressure compressor 44 and a first (or low) pressure turbine 46. Inner shaft 40 is connected to fan 42 through a speed change mechanism, which in this exemplary embodiment is illustrated as a geared structure 48 to drive fan 42 at a lower speed than the low speed spool 30. High speed spool 32 includes an outer shaft 50 that interconnects a second (or high) pressure compressor 52 and a second (or high) pressure turbine 54. Combustor 56 is positioned between high pressure compressor 52 and high-pressure turbine 54. A mid-turbine frame 57 of the engine static structure 36 may be arranged generally between the high-pressure turbine 54 and the low-pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core air flow is first compressed by low pressure compressor 44, and then by the high-pressure compressor 52. Thereafter, the core air flow is mixed and burned with fuel in combustor 56, then expanded in high pressure turbine 54 and low-pressure turbine 46. The mid-turbine frame 57 includes airfoils 59 which are in the core airflow path C. The turbines 46 and 54 rotationally drive the respective low speed spool 30 and high-speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low-pressure compressor, or aft of the combustor section 26 or even aft of turbine section 28, and fan 42 may be positioned forward or aft of the location of gear system 48.

The turbine section 28 includes at least one rotor and at least one blade extending radially outwardly from the rotor. The turbine section 28 may further include a blade outer air seal(s) (BOAS(s)). The blade outer air seal can be an assembly of a plurality of BOAS segments that together form an annular shaped shroud around the engine's central longitudinal axis A which is positioned between an outer casing of the engine and the turbine blade(s) of the turbine section.

With reference to FIGS. 2A, 2B, 2C, 2D, and 2E, an example embodiment of a retaining split ring stack for axial retention of a ceramic matric composite (CMC) gas path component 230 is disclosed. The retaining split ring stack includes an outer-most split ring 200 having an outer diameter configured for retention within a diametric groove 212 within a static support structure 210 when uncompressed.

The diametric groove 212 may have a cross section that substantially corresponds with that of the outer portion of the outer-most split ring 200, such as the substantially rectangular section illustrated. Typically, both the static support structure 210 and the outer-most split ring 200 made be made of a suitable metal that can withstand the forces and temperatures that they are exposed to, and may be made of a high Nickel (Ni) content alloy or a high Cobalt (Co) content alloy (which may also include some Ni).

Figure 2A:
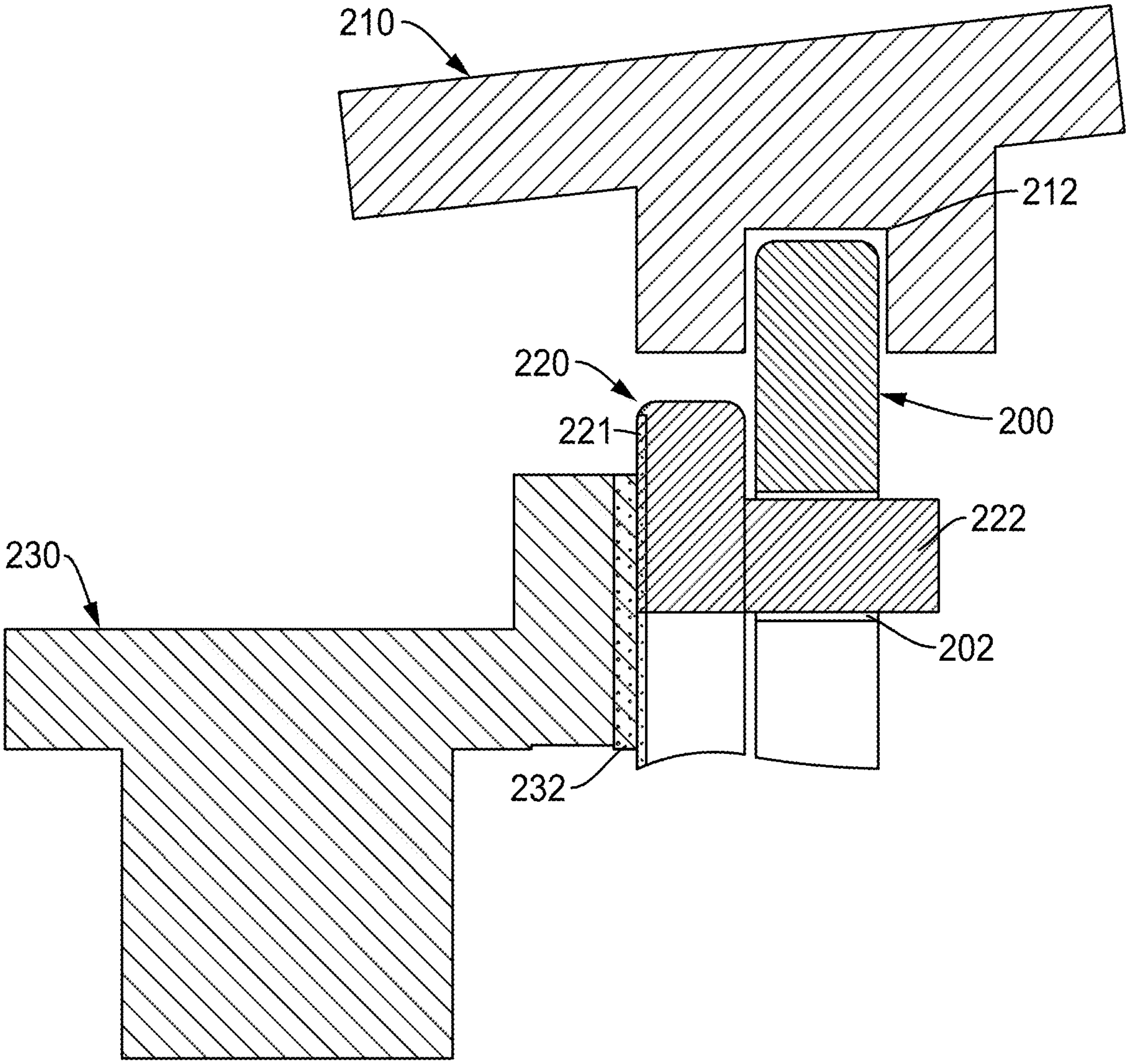
FIG. 2A schematically illustrates a cross section of an example embodiment of a retaining split ring stack in accordance with the present disclosure.
Figure 2B:
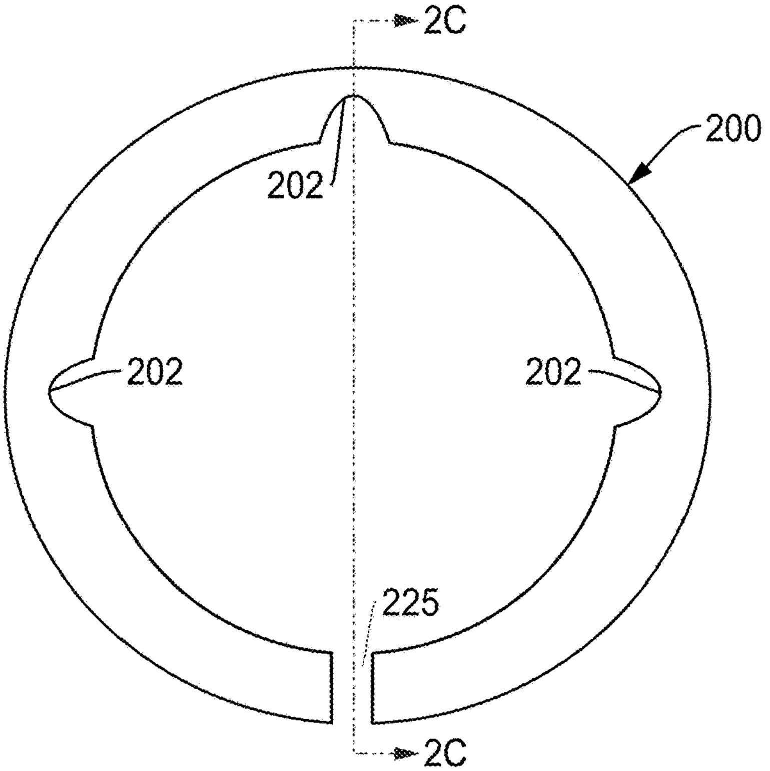
FIG. 2B schematically illustrates an axial view of an example embodiment of an outer-most split ring in accordance with the present disclosure.
Figure 2C:
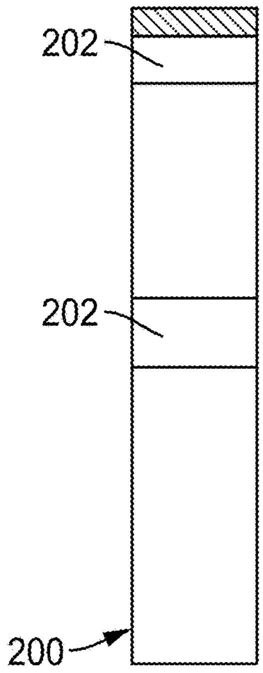
FIG. 2C schematically illustrates a cross section of the outer-most split ring of FIG. 2B in accordance with the present disclosure.

The outer-most split ring 200 also includes an inner diameter that has a plurality of scallops 202 formed therein. The scallops 202 may be concavities in the inner surface and may take any suitable form, including but not limited to semi-circular shapes, concave prismatic shapes, semi-elliptical shapes, tombstone shapes, and the like. The scallops 202 may be evenly spaced from each other. For example, as illustrated in FIG. 2B, three scallops 202 may be spaced at 90° arc segments. While three scallops 202 are illustrated, embodiments within the present disclosure are not limited thereto, and other examples may use four, five, or more scallops without departing from the present disclosure. The scallops 202 may be formed in any suitable manner including stamping, forging, and/or machining.

As illustrated in FIG. 2B, the outer-most split ring 200 includes a split portion configured to permit compression of the outer-most ring 200 to a smaller diameter for installation within the diametric groove 212.

The retaining split ring stack in accordance with the present disclosure also includes an inner-most split ring 220 that has an outer diameter that is smaller than that of the outer-most split ring 200. The inner-most split ring 220 includes an inner diameter, an upstream surface configured for contact with the CMC gas path component 230, and a downstream surface including a plurality of tabs 222 extending therefrom and configured for engagement with respective scallops 202 of the outer-most split ring 200.

Figure 2D:
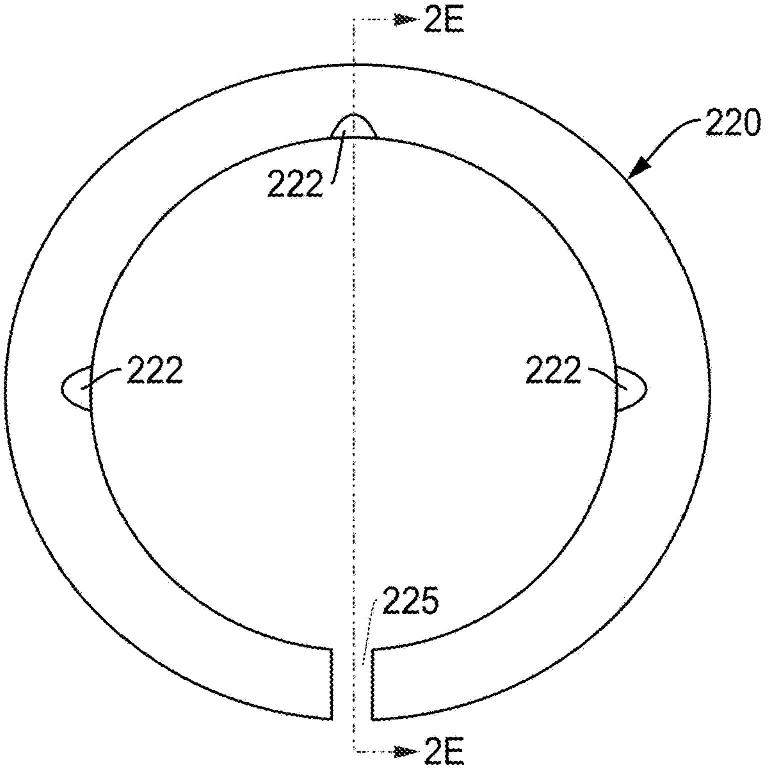
FIG. 2D schematically illustrates an axial view of an example embodiment of an inner-most split ring in accordance with the present disclosure.
Figure 2E:
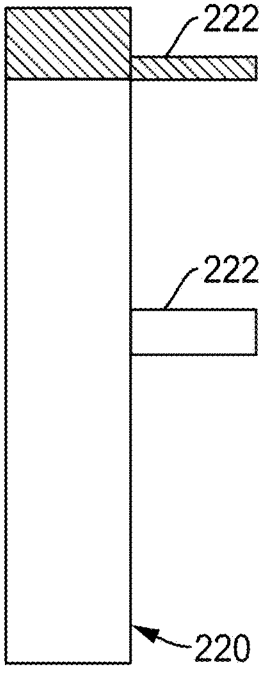
FIG. 2E schematically illustrates a cross section of the inner-most split ring of FIG. 2D in accordance with the present disclosure.

As illustrated in FIG. 2D, the inner-most split ring 220 also includes a split portion 225 configured to permit compression of the inner-most ring 220 to a smaller diameter for installation of the tabs 222 within the respective scallops 202 of the outer-most split ring 200.

The inner-most split ring 220 made be made of a suitable metal that can withstand the forces and temperatures that it is exposed to, and may be made of a high Nickel (Ni) content alloy or a high Cobalt (Co) content alloy. When Ni-containing alloys are used, the inner-most split ring 220 or at least the upstream surface thereof that contacts the CMC gas path component may be coated with an environmental barrier coating (EBC) for compatibility with the CMC material. The upstream surface of inner-most split ring 220 may contact a hot surface 232 of CMC gas path component 230 that has a high thermal gradient. Metallurgical reactions can occur to exposed high Ni-content superalloys when in contact with high temperature capable SiC ceramics. These reactions negatively impact the mechanical properties of both the ceramic and Ni-alloy and may be avoided with an EBC on the inner-most split ring 220.

The tabs 222 may be evenly spaced from each other. For example, as illustrated in FIG. 2D, three tabs 222 may be spaced at 90° arc segments. While three tabs 222 are illustrated, embodiments within the present disclosure are not limited thereto, and other examples may use four, five, or more tabs without departing from the present disclosure. The tabs 222 may be formed in any suitable manner including stamping, forging, brazing, welding, and/or machining.

The tabs 222 are positioned on the inner-most split ring 220 so as to engage with the concavities of scallops 202 and may similarly take any suitable form corresponding to the scallops, including but not limited to cross sections with semi-circular shapes, prismatic shapes, semi-elliptical shapes, tombstone shapes, and the like.

Figure 3:
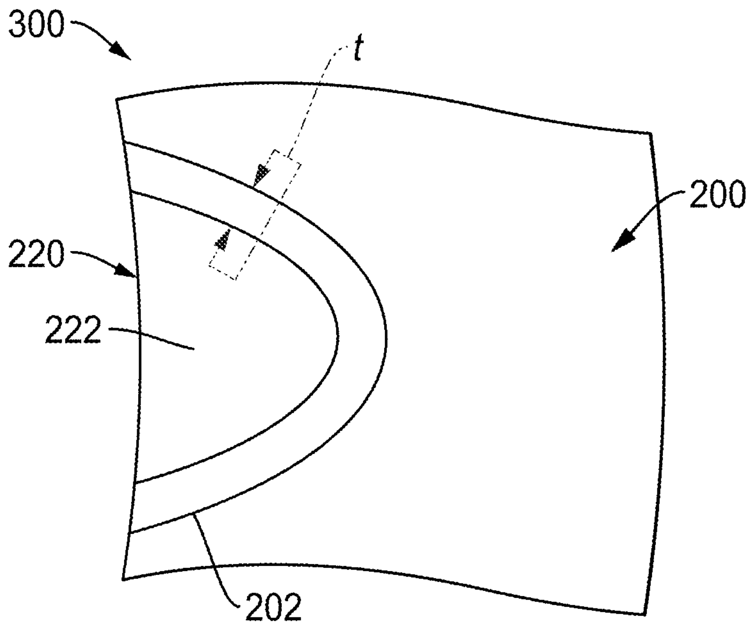
FIG. 3 schematically illustrates a close-up axial cross-section of an example connection point between the inner-most and outer-most split rings in accordance with the present disclosure.

As illustrated schematically (and not to scale) in FIG. 3, a cross section of the plurality of tabs 222 may be dimensioned smaller than the concavity of the plurality of scallops 202 so as to form a clearance gap t to allow the tabs 222 to fit within the scallops 202 both when the inner-most split ring 220 is compressed to the smaller diameter and when the inner-most split ring 220 is uncompressed to its relaxed outside diameter.

Figure 4:
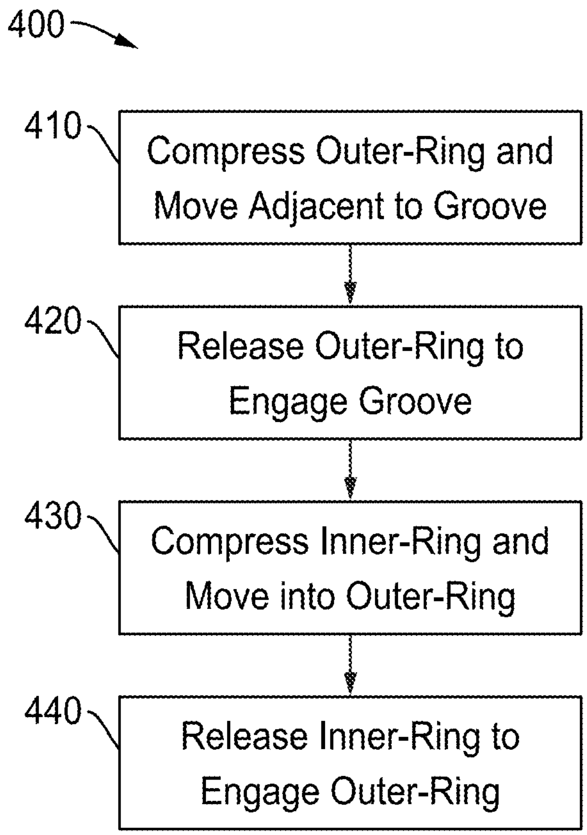
FIG. 4 is a flow diagram of an example process in accordance with the present disclosure.

With reference to FIG. 4, a method 400 for axial retention of a ceramic matric composite (CMC) gas path component using a retaining split ring stack is illustrated in a flow chart.

The method 400 includes step 410 of compressing an outer-most split ring from a first outer diameter to a first smaller diameter for installation within a diametric groove, wherein the outer-most split ring includes a plurality of scallops on an inner diameter thereof, and moving or otherwise positioning the outer-most split ring in axial alignment with the diametric groove.

In a next step 420, the compression force may be released to uncompress the outer-most split ring to engage the diametric groove.

Method 400 continues with step 430, which involves compressing an inner-most split ring from a second outer diameter smaller than the first outer diameter to a second smaller diameter, wherein the inner-most split ring includes a plurality of tabs on a downstream surface thereof, and moving or otherwise positioning the plurality of tabs in axial alignment with the plurality of scallops.

The method 400 further includes step 440 of uncompressing the inner-most split ring for installation of the tabs within respective scallops of the outer-most split ring.

In various embodiments of method 400, the outer-most split ring may be formed of a metallic alloy, and the diametric groove may be disposed in a static support structure to axially fix the outer-most split ring. In other embodiments, the inner-most split ring may be formed of a metallic alloy, and an upstream surface of the inner-most split ring may be positioned against the CMC gas path component to axially retain the CMC gas path component.

In one or more embodiments of method 400, a coating may be applied on the upstream surface of the inner-most split ring that contacts the CMC gas path component. Embodiments of the method 400 may also include evenly spacing the plurality of scallops around the first inner diameter, as well as evenly spacing the plurality of tabs around the downstream surface of the inner-most split ring.

In various embodiments in accordance with the present disclosure, method 400 may also include dimensioning the plurality of tabs smaller than the plurality of scallops so as to form a clearance gap to allow the tabs to fit within the scallops both when the inner-split ring is compressed to the second smaller diameter and when the inner-split ring is uncompressed to the second outer diameter.

Embodiments in accordance with the present disclosure may permit additional material selection options to make design selections for strength, CTE, and compatibility with CMC gas path components. Additionally, embodiments may result in reduced hoop stress within the CMC gas path component so as to allow the use of more CMC details to replace conventionally metallic hardware, leading to improved durability and performance within engine architectures. Embodiments in accordance with the present disclosure also provide repairability options with strategically designed inner-most split rings, wear coatings, and thermal barrier coatings to manage metallurgical wear systems, thermal gradient insulation, and thermal cycling.

While the present disclosure has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present disclosure.

What is claimed is:

1. A retaining split ring stack for axial retention of a ceramic matric composite (CMC) gas path component, the retaining split ring stack comprising:

an outer-most split ring having a first outer diameter configured for retention within a diametric groove within a support structure, a first inner diameter including a plurality of scallops, and a first split portion configured to permit compression of the outer-most ring to a first smaller diameter for installation within the diametric groove; and an inner-most split ring having a second outer diameter smaller than the first outer diameter, a second inner diameter, an upstream surface configured for contact with the CMC gas path component, a downstream surface including a plurality of tabs extending therefrom and configured for engagement with respective scallops of the outer-most split ring, and a second split portion configured to permit compression of the inner-most ring to a second smaller diameter for installation of the tabs within the respective scallops of the outer-most split ring.

2. The retaining split ring stack of claim 1, wherein the outer-most split ring is formed of a metallic alloy.

3. The retaining split ring stack of claim 2, wherein the inner-most split ring is formed of a metallic alloy.

4. The retaining split ring stack of claim 3, wherein the inner-most split ring includes a coating on at least the upstream surface.

5. The retaining split ring stack of claim 1, wherein the plurality of scallops are evenly spaced around the first inner diameter.

6. The retaining split ring stack of claim 5, wherein the plurality of tabs are evenly spaced around the downstream surface of the inner-most split ring.

7. The retaining split ring stack of claim 6, wherein the plurality of tabs are dimensioned smaller than the plurality of scallops so as to form a clearance gap to allow the tabs to fit within the scallops both when the inner-split ring is compressed to the second smaller diameter and when the inner-split ring is uncompressed to the second outside diameter.

8. A method for axial retention of a ceramic matric composite (CMC) gas path component using a retaining split ring stack, the method comprising:

compressing an outer-most split ring from a first outer diameter to a first smaller diameter for installation within a diametric groove, wherein the outer-most split ring includes a plurality of scallops on an inner diameter thereof;

positioning the outer-most split ring in axial alignment with the diametric groove;

uncompressing the outer-most split ring to engage the diametric groove;

compressing an inner-most split ring from a second outer diameter smaller than the first outer diameter to a second smaller diameter, wherein the inner-most split ring includes a plurality of tabs on a downstream surface thereof;

positioning the plurality of tabs in axial alignment with the plurality of scallops; and uncompressing the inner-most split ring for installation of the tabs within respective scallops of the outer-most split ring.

9. The method of claim 8, wherein the outer-most split ring is formed of a metallic alloy; and the diametric groove is disposed in a static support structure to axially fix the outer-most split ring.

10. The method of claim 9, wherein the inner-most split ring is formed of a metallic alloy; and an upstream surface of the inner-most split ring is positioned against the CMC gas path component to axially retain the CMC gas path component.

11. The method of claim 10, further comprising providing a coating on the upstream surface of the inner-most split ring that contacts the CMC gas path component.

12. The method of claim 8, further comprising evenly spacing the plurality of scallops around the first inner diameter.

13. The method of claim 12, further comprising evenly spacing the plurality of tabs around the downstream surface of the inner-most split ring.

14. The method of claim 13, further comprising dimensioning the plurality of tabs smaller than the plurality of scallops so as to form a clearance gap to allow the tabs to fit within the scallops both when the inner-split ring is compressed to the second smaller diameter and when the inner-split ring is uncompressed to the second outer diameter.

15. A retaining split ring stack for axial retention of a ceramic matric composite (CMC) gas path component, the retaining split ring stack comprising:

an outer-most split ring made of metal and having a first outer diameter configured for retention within a diametric groove within a support structure, a first inner diameter including a plurality of scallops evenly space from one another, and a first split portion configured to permit compression of the outer-most ring to a first smaller diameter for installation within the diametric groove; and an inner-most split ring made of metal and having a second outer diameter smaller than the first outer diameter, a second inner diameter, an upstream surface configured for contact with the CMC gas path component, a downstream surface including a plurality of tabs extending therefrom that are evenly spaced from one another and configured for engagement with respective scallops of the outer-most split ring, and a second split portion configured to permit compression of the inner-most ring to a second smaller diameter for installation of the tabs within the respective scallops of the outer-most split ring.

16. The retaining split ring stack of claim 15, wherein the outer-most split ring is formed of a high Nickel (Ni) content alloy.

17. The retaining split ring stack of claim 15, wherein the inner-most split ring is formed of a high Nickel (Ni) content alloy or a high Cobalt (Co) content alloy.

18. The retaining split ring stack of claim 17, wherein the inner-most split ring is formed of a high Nickel (Ni) content alloy, and the inner-most split ring includes an environmental barrier coating (EBC) on at least the upstream surface.

19. The retaining split ring stack of claim 15, wherein the outer-most split ring is formed of a high Nickel (Ni) content alloy, and the inner-most split ring is formed of a high Nickel (Ni) content alloy or a high Cobalt (Co) content alloy.

20. The retaining split ring stack of claim 15, wherein the plurality of tabs are dimensioned smaller than the plurality of scallops so as to form a clearance gap to allow the tabs to fit within the scallops both when the inner-split ring is compressed to the second smaller diameter and when the inner-split ring is uncompressed to the second outside diameter.

* * * * *